US005314362A

United States Patent [19]

Nagahora

[11] Patent Number: 5,314,362

[45] Date of Patent: May 24, 1994

[54] THROTTLE OPENING LIMITING SYSTEM FOR A MARINE PROPULSION UNIT

[75] Inventor: Osamu Nagahora, Hamamatsu, Japan

[73] Assignee: Sanshin Kogyo Kabushiki Kaisha, Hamamatsu, Japan

[21] Appl. No.: 66,340

[22] Filed: May 21, 1993

Related U.S. Application Data

[63] Continuation of Ser. No. 706,805, May 29, 1991, abandoned.

[30] Foreign Application Priority Data

May 31, 1990 [JP] Japan .................................. 2-139947

[51] Int. Cl.[5] .............................................. B60K 41/00

[52] U.S. Cl. ........................................ 440/86; 440/84; 440/900

[58] Field of Search .................................... 440/84-87, 440/900, 1, 2, 15; 74/480 B, 480 R, 479, 856, 857, 860, 872, 873, 878, 879; 192/0.092, 0.062, 0.096

[56] References Cited

U.S. PATENT DOCUMENTS 2,785,584 3/1957 Hambleton ............................ 440/87
3,317,012 5/1967 Heidner et al. ........................ 440/87
4,755,156 7/1988 Wagner ................................ 440/87

*Primary Examiner*—Edwin L. Swinehart
*Attorney, Agent, or Firm*—Knobbe, Martens, Olson & Bear

[57] ABSTRACT

A throttle opening limiting system is provided for a marine propulsion unit comprising a throttle, a manually operated throttle control device and an intermediate linkage arrangement operatively connecting the manually operated throttle control device to the throttle. The intermediate linkage arrangement further comprises a means for setting a distinct and different maximum obtainable throttle opening position for each of a forward, a neutral and a reverse operative state of the marine propulsion unit. The throttle opening limiting system is fully openable in the forward operative state, is limited to an intermediate position in the reverse operative state, and is limited to a smaller opening position in the neutral operative state than the intermediate position of the reverse operative state. The throttle opening limiting system is capable of preventing overspeed engine rotation in both the neutral and reverse transmission operative states, while nevertheless securing the necessary thrust required for proper running of the craft in the reverse operative state.

19 Claims, 4 Drawing Sheets

THROTTLE OPENING LIMITING SYSTEM FOR A MARINE PROPULSION UNIT

This is a continuation of U.S. patent application Ser. No. 07/706,805, filed May 29, 1991, now abandoned.

BACKGROUND OF THE INVENTION

This invention relates to a throttle opening limiting system for a marine propulsion unit, and particularly for watercraft outboard, as well as inboard-outboard, motors.

It has been known to provide a throttle opening limiting means in conjunction with a forward, neutral and reverse transmission system as a part of a watercraft propulsion unit. Such limiting means are operable to allow full opening of the engine throttle when the transmission is employed in the forward operating state, and to limit the throttle to an intermediate opening when the transmission is employed in the neutral or reverse operating states. Thus, overspeed rotation of the engine due to a fully opened throttle when the transmission is shifted into the neutral or reverse operating states may be avoided.

A problem with such throttle limiting systems exists, however, due to the fact that the maximum throttle openings for the neutral and reverse operative states have been set equal to one another. Thus, overspeed engine rotation cannot be prevented in the neutral operative state when the maximum throttle opening necessary for securing the proper thrust required for reverse running is employed. On the other hand, the maximum throttle opening necessary for preventing overspeed engine rotation in the neutral operative state cannot provide the necessary thrust required for proper running of the craft in the reverse operative state.

It is, therefore, a principal object of this invention to provide an improved throttle opening limiting system for a marine propulsion unit.

It is further an object of this invention to provide a throttle opening limiting system capable of preventing overspeed engine rotation in both the neutral and reverse transmission operative states, while nevertheless securing the necessary thrust required for proper running of the craft in the reverse operative state.

SUMMARY OF THE INVENTION

A throttle opening limiting system is provided for a marine propulsion unit comprising a manually operated transmission control system for shifting between forward, neutral and reverse operative states; and further, a throttle, a manually operated throttle control device and an intermediate linkage arrangement operatively connecting the manually operated throttle control device to the throttle. The intermediate linkage arrangement further comprises a means for setting a distinct and different maximum obtainable throttle opening position for each of a forward, a neutral and a reverse operative state of the marine propulsion unit.

DETAILED DESCRIPTION OF THE PREFERRED EMBODIMENTS

Figure 1:
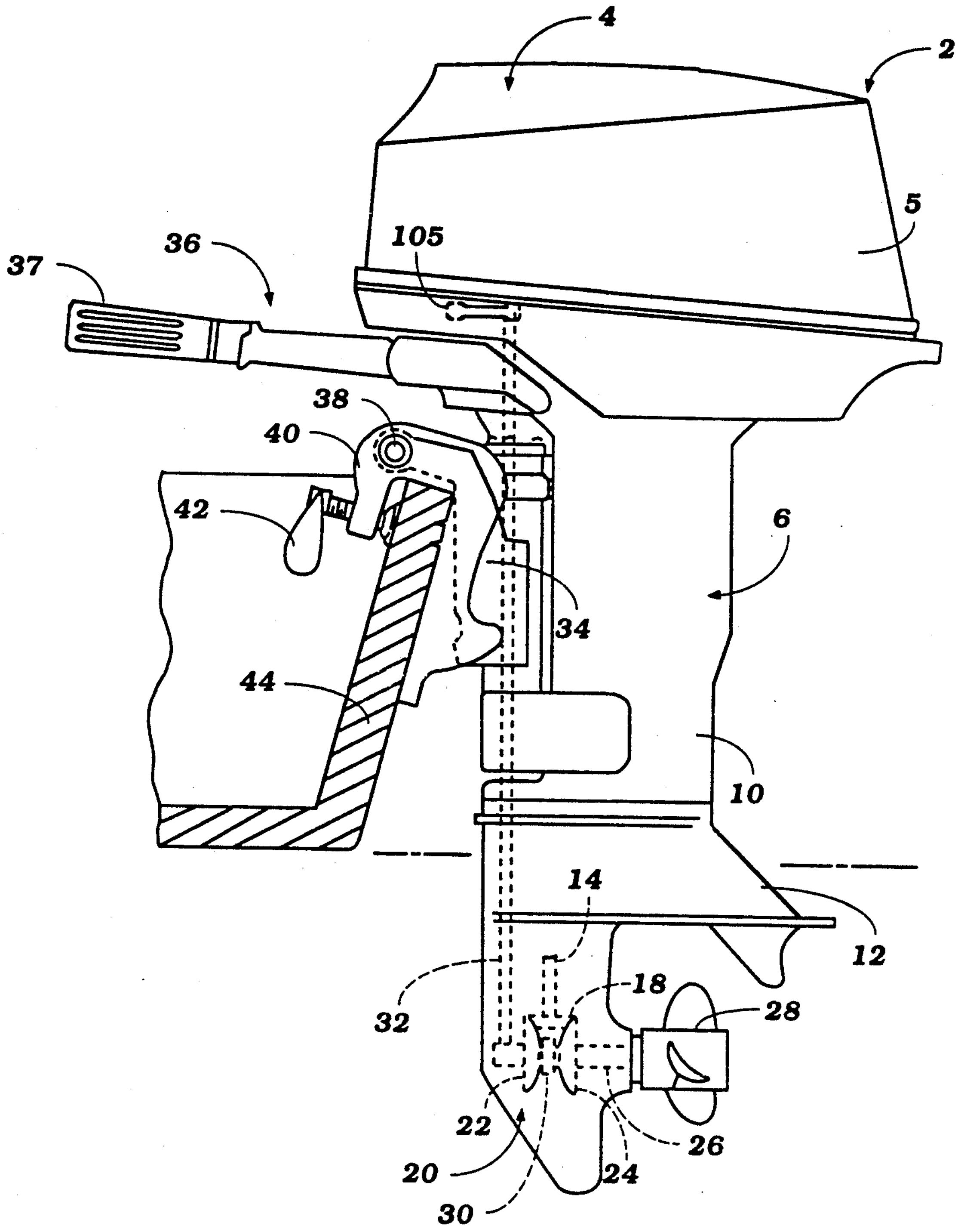
FIG. 1 is a side elevational view of an outboard motor incorporating a throttle opening limiting system constructed in accordance with the invention and as attached to the transom of an associated watercraft, which is shown partially and in cross-section.
Figure 2:
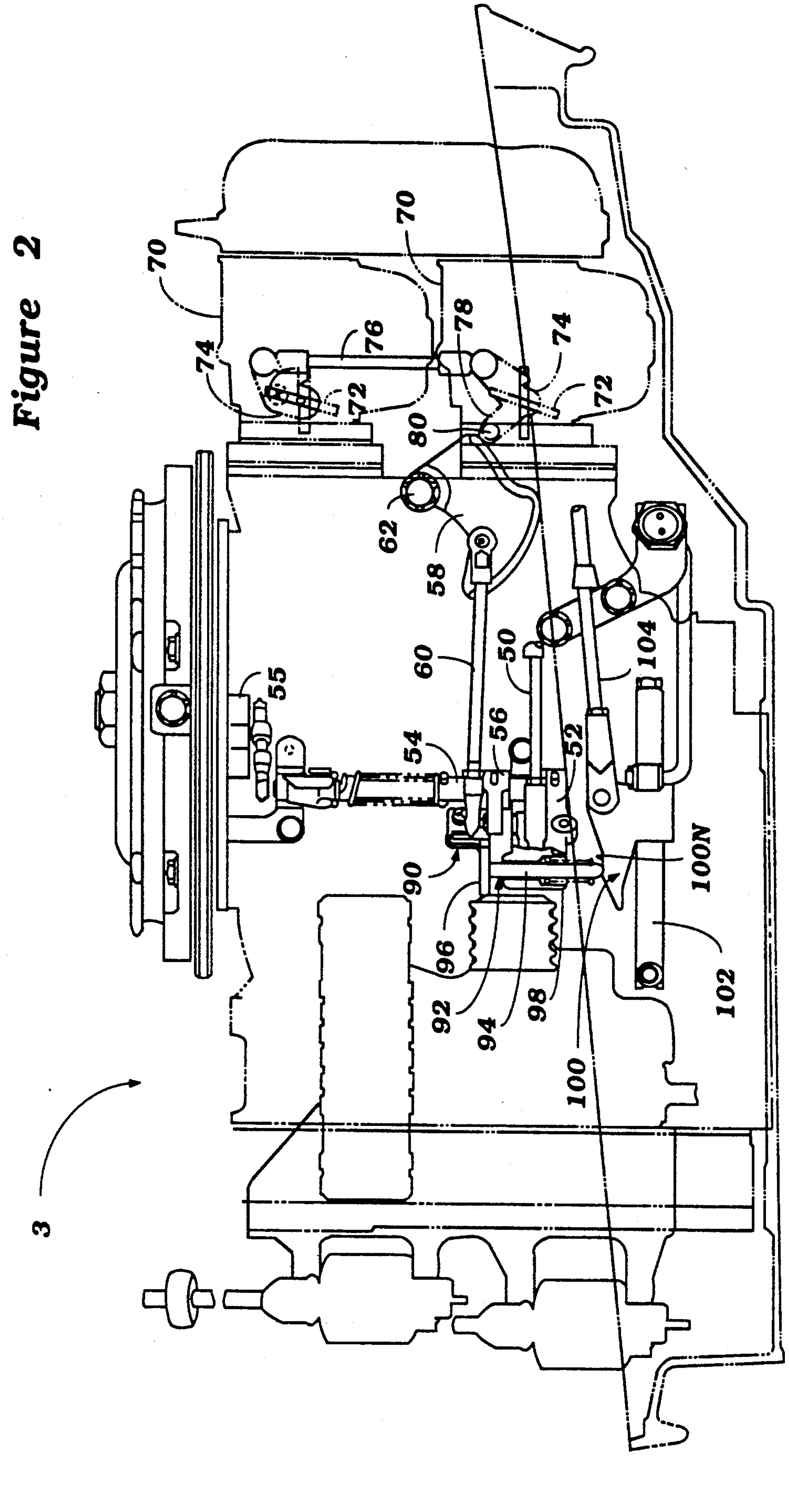
FIG. 2 is a side elevational view of an engine in accordance with the invention and shows an embodiment of the throttle control mechanism.
Figure 3:
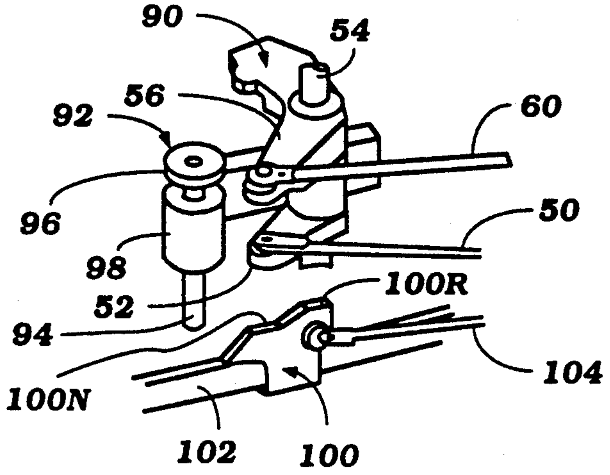
FIG. 3 is an enlarged side elevational view of the throttle control mechanism of FIG. 2.

Referring first to FIG. 1, an outboard motor constructed in accordance with the invention is identified generally by the reference numeral 2. Although the invention is described in conjunction with an outboard motor, it is to be understood that the invention may be equally well practiced with an inboard-outboard watercraft propulsion system.

The outboard motor 2 includes a power head, indicated generally by the reference numeral 4, which is comprised of a powering internal combustion engine that is surrounded by a protective cowling 5. A driveshaft housing 6 depends from the powerhead 4 and rotatably journals a driveshaft. The driveshaft housing 6 includes an outer housing 10 from which a lower unit 12 depends.

The driveshaft, which is indicated generally by the reference numeral 14, extends through the lower unit 12 and has affixed to it a bevel gear 18 of a forward neutral reverse transmission, indicated generally by the reference numeral 20. This transmission includes a pair of oppositely disposed bevel gears 22 and 24 that are in mesh with the driving bevel gear 18 on diametrically opposite sides. As such, the bevel gears 22 and 24 will be continuously driven in opposite directions.

The bevel gears 22 and 24 are journaled upon a propeller shaft 26 which is, in turn, journaled in a known manner within the lower unit 12. A propeller 28 is affixed to the propeller shaft 26 for rotation with it. A dog clutching element 30 is disposed between the bevel gears 22 and 24 and is splined for rotation with the propeller shaft 26. The dog clutching element 30 is adapted to be slid axially into engagement with cooperating dog clutching elements formed on the gears 22 or 24 so as to rotatably couple these gears for rotation with the propeller shaft 26 so as to drive the propeller 28 in selected forward and reverse directions. A shift rod 32 is supported within the driveshaft housing 6 and lower unit 12 and operates the dog clutching element 30 in a known manner. Additionally, the dog clutching element 30 may be positioned such that it does not engage either of the gears 22 or 24, thus providing a neutral transmission state.

A steering shaft (not shown) is affixed to the driveshaft housing 6 and is journaled within a swivel bracket 34 for steering of the outboard motor 2 about a vertically extending steering axis. AA tiller 36, having a throttle grip 37 at one end thereof, is affixed to the upper end of the steering shaft for this steering operation. The swivel bracket 34 is, in turn, pivotably supported by means of a pivot pin 38 and clamping bracket 40 for tilting movement of the outboard motor 2 about a horizontally disposed tilt axis defined by pivot pin 38. The clamping bracket 40 is provided with a clamp 42 so as to afford a detachable connection to a transom 44 of an associated watercraft.

The construction of the outboard motor as thus far described may be considered to be conventional and is depicted only for exemplary purposes. The invention relates to a throttle opening limiting system and will now be described with reference to the remaining figures.

Referring now additionally to FIGS. 2 through 5 a first embodiment of the throttle limiting system in accordance with the invention will be described.

Throttling action is initiated manually by an operator by way of the throttle grip 37 located at an end of the tiller 36. Upon turning the throttle grip 37 a reciprocating movement is imparted to a cable 50 which is, in turn, pivotally connected to . one end of a drive lever 52. The drive lever 52 is pivotally mounted about a shaft member 54 at its other end, and pivotally moves via movement of the cable 50.

A second lever 56 is also mounted about the shaft 54, above the drive lever 52. The second lever 56 is pivotally moved by moving the drive lever 52, as the two levers 52 and 56 are integrally connected via the shaft 54. The second lever 56 is connected to a throttle cam 58 through an intermediate link 60. The throttle cam 58 is pivotally movable about a cam shaft 62, upon movement of the intermediate link 60.

The shaft 54 proceeds upwardly above the levers 52 and 56 and connects to a spark advance mechanism 55 located in an upper region of the engine 3.

The engine 3 is provided with a plurality of vertically spaced charge formers such as carburetors 70. Each of the carburetors 70 is provided with an individual throttle valve 72 that controls the air flow through the induction passages (not shown) of the respective carburetor 70. Each throttle valve 72 is affixed to a respective throttle valve shaft that is journaled in the body of the carburetor in a known manner. Throttle control levers 74 are affixed to one end of these throttle valve shafts and are interconnected to a link 76 by means of pivotal connections so that the throttle valves 72 will all be rotated simultaneously.

One of the throttle control levers 74 is provided with an extension portion 78 that carries a roller follower 80. The roller follower 80 is adapted to be engaged by the cam 58. Thus, a continuous linkage system is provided from the manually operated throttle grip 37 and ultimately to the throttle valves 72, thereby allowing an operator to remotely control opening and closing operations of the throttle valves 72.

The drive lever 56 is a bell crank with an arm at its end opposite the arm attached to the intermediate link 60 which serves as a throttle limiting lever 90. A vertically movable stopper member 92 having an elongated shank 94 and a disk-shaped head portion 96 is supported near the throttle limiting lever 90 within a stopper holder member 98. It should be noted that the diameter of the disk-shaped head 96 is greater than the diameter of the elongated shank 94.

A stopper control cam 100 is provided near the bottom of the stopper member 92 and is movable along a guide member 102 with movement of a shift operating cable 104 which is pivotally connected to an upper edge of the stopper control cam 100. The shift operating cable 104 is coupled at its other end to a shift control lever 105 (FIG. 1) operable to impart movement to the stopper control cam 100. The stopper control cam 100 has a stepped upper surface with two plateau portions 100N and 100R. The leading edge of the stopper control cam 100 and the region between the two plateau portions are diagonally sloped extensions.

The stopper control cam 100 can be brought into sliding engagement with a lowermost portion of the vertically movable stopper 92 via movement of the shift operating cable 104. As the leading edge of the stopper control cam 100 passes below the stopper 92, the stopper 92 is raised vertically. Eventually, the stopper 92 is raised to a fixed vertical location as the bottom of the stopper 92 rests upon the lower plateau portion 100N of the stopper control cam 100. Upon further movement of the stopper control cam 100 the stopper 92 continues to raise vertically until it comes to another fixed vertical location at which the bottom of the stopper 92 rests upon the higher plateau portion 100R of the stopper control cam 100.

When the stopper control cam 100 is not in contact with the vertically movable stopper 92, the stopper 92 rests at its lowest vertical position. At this lowest position, the disk-shaped head 96 of the stopper 92 lies in a plane which is below the plane of pivotal rotation of the throttle limiting lever 90. Thus, the throttle limiting lever 90 may pivot without being impeded by the vertically movable stopper 92. Under this condition, the watercraft may operate in the forward operative state, with the throttle valve 72 being fully openable.

When the lowermost portion of the vertically movable stopper 92 rests upon the lower plateau portion 100N of the stopper control cam 100, the disk-shaped head 96 of the stopper 92 lies in a plane identical to the plane of rotation of the throttle limiting lever 90. Thus, the throttle limiting lever 90 contacts, and is stopped, during its rotation by the disk-shaped head 96 of the stopper 92. Accordingly, the opposite end of the driven lever 56, of which the throttle limiting lever 90 is an integral part, is limited in its pivotal movement and therefore the driven lever can impart only a limited movement to the attached intermediate link 60. Under this condition the watercraft operates in the neutral state, with the throttle valve 72 only partially openable.

When the lowermost portion of the vertically movable stopper 92 rests upon the higher plateau portion 100R of the stopper control cam 100, the disk-shaped head 96 of the stopper 92 lies in a plane above the plane of rotation of the throttle limiting lever 90. Thus, the throttle limiting lever 90 contacts, and is stopped, during its rotation by a portion of the shank 94 of the stopper below the disk-shaped head 96 of the stopper 92. Accordingly, the opposite end of the driven lever 56, of which the throttle limiting lever 90 is an integral part, is limited in its pivotal movement. Therefore, the driven lever 56 can impart only a limited movement to the attached intermediate link 60. It should be noted that the pivotal movement of the driven lever 56 under this condition is not limited to the degree, as discussed above, when the lowermost portion of the vertically movable stopper 92 rests upon the lower plateau portion 100N of the stopper control cam 100. This is due to the smaller diameter of the shank portion 94 of the stopper 92 as compared to the diameter of the disk-shaped head 96. Under this condition the watercraft operates in the reverse state, with the throttle valve 72 limited to an opening position less than that of the forward operating state, but greater than that of the neutral operating state.

It should be noted that the diameter of the disk-shaped head 96 and the shank portion 94 of the stopper 92 may be changed. Such adjustments allow variations in the quantity of movement permitted to the link 60, and thus may control the degree of opening allowed each throttle valve 72 in the neutral and reverse operating states.

Figure 4:
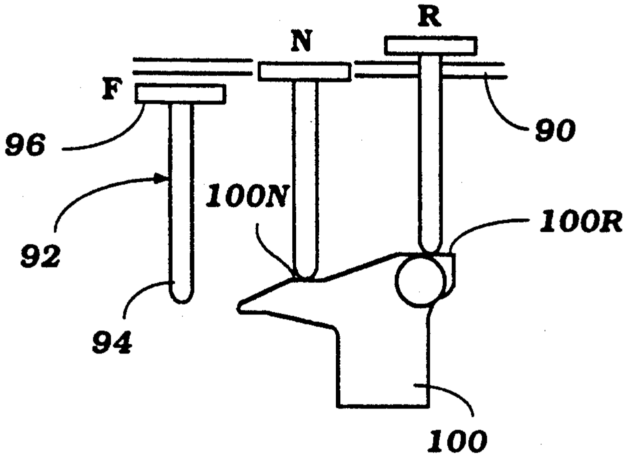
FIG. 4 is a further enlarged side elevational view of the throttle control mechanism of FIG. 2 in different transmission conditions.
Figure 5:
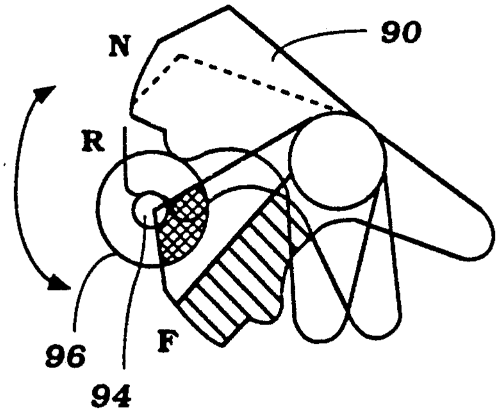
FIG. 5 is an enlarged top plan view of the throttle control mechanism of FIG. 2 in different transmission conditions.

In FIGS. 4 and 5 the reference letters F, N and R depict the relative positioning of the above discussed elements in the forward, neutral and reverse operative states, respectively.

These Figures also illustrate another important feature of the invention; that is, that when the watercraft is being operated in the forward operative state at a speed greater than the maximum neutral operating speed it is not possible to shift directly to the neutral or reverse operative states. This is so because contact of the disk-shaped head 96 with the underside of the throttle limiting lever 90 would take place upon attempting such a forward to neutral or reverse transition. However, when operating in the neutral operative state it is possible to shift directly to the reverse operative state, as there is no such impediment to the movement of the stopper 92, as above.

Figure 6:
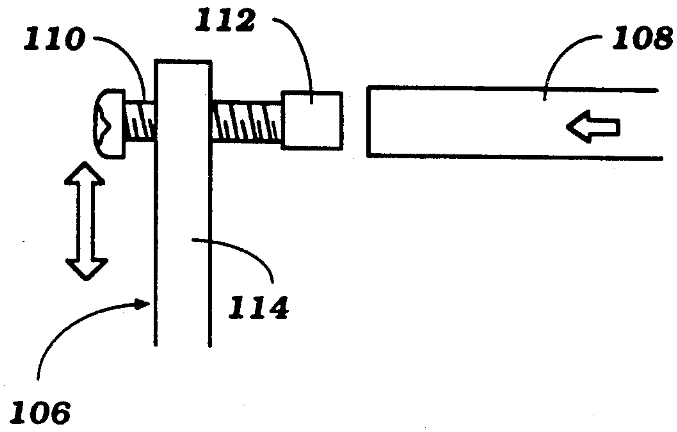
FIG. 6 is a side elevational view of the throttle control mechanism in accordance with a second embodiment of the invention.

FIG. 6 depicts a second embodiment of the invention. The structure and operation of the second embodiment is very similar to the embodiment of FIGS. 2 through 5. A major difference, however, exists in the construction of the head region of the vertically movable stopper 106. As shown in FIG. 6, the head is provided with a variably adjustable threaded head member 110 received within a receiving hole along the top of the stopper 106. The end of the threaded head member 110 nearest to the throttle limiting lever 108 is provided with a blunt portion 112 for contacting the throttle limiting lever 108 under certain conditions, to be described below.

Operation of the embodiment of FIG. 6 closely parallels that of the embodiment of FIGS. 2 through 5. However, when operating the watercraft in the neutral operative state, the threaded head member 110, instead of the disk-shaped head 96, lies in the same plane as the plane of movement of the throttle limiting lever 108; and accordingly, movement of the throttle limiting lever 108 is limited upon contacting the blunt portion 112 of the threaded head member 110.

When operating the watercraft in the reverse operative state, the threaded head member 110 lies in a plane above the plane of movement of the throttle limiting lever 108. Thus, during movement the throttle limiting lever 110 contacts, and is stopped by, the elongated shank portion 114 of the vertically movable stopper 106.

When operating the watercraft in the forward operative state, the threaded head member 110 lies in a plane below the plane of movement of the throttle limiting lever 108. So there is no impediment to block the movement of the throttle limiting lever 108 in this operative state.

For the same reasons as set out above, it is not possible to shift directly to the neutral or reverse operative states when operating in the forward operative state at a speed greater than the maximum neutral operating speed in the embodiment of FIG. 6.

Figure 7:
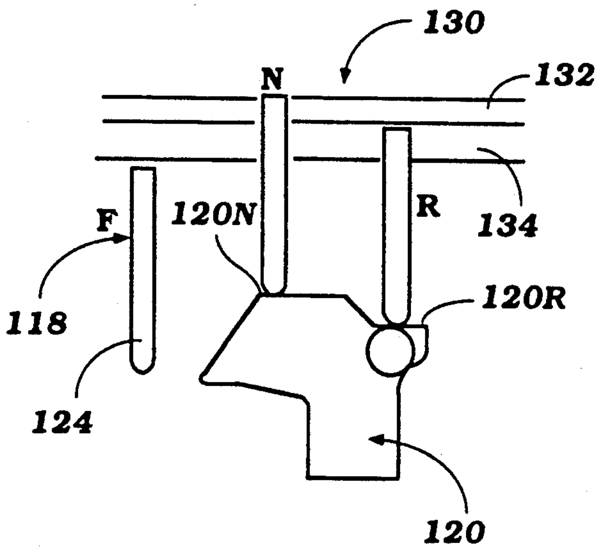
FIG. 7 is a side elevational view of the throttle control mechanism in accordance with a third embodiment of the invention.
Figure 8:
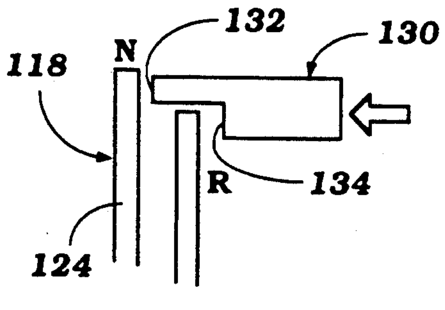
FIG. 8 is a further side elevational view of the throttle control mechanism in accordance with the embodiment of FIG. 7.

A third embodiment is depicted in FIGS. 7 and 8. As shown in FIG. 7, the stopper control cam 120 of this embodiment has a slightly different construction from the stopper control cam 100 of the embodiment of FIGS. 2 through 5. The difference, as is readily apparent from the Figures, is in the linear arrangement of the two plateaued portions 120N and 120R along the top of the stopper control cam 120. Another difference is in the construction of the vertically movable stopper 118 of the embodiment of FIGS. 7 and 8. In this embodiment the stopper 118 is formed solely as an elongated rod comprising a shank 124. The throttle limiting lever 130 of the embodiment of FIGS. 7 and 8 also differs from the two embodiments discussed above. As shown in the Figures, the stopper-contacting side of the throttle limiting lever 130 has a stepped leading face with an upper vertically extending leading edge 132 and a lower vertically extending portion 134 located below and rearwardly of the upper leading edge 132.

As in FIGS. 4 and 5, the reference letters F, N and R depict the relative positioning of the above discussed elements in the forward, neutral and reverse operative states, respectively.

Further with reference to the embodiment of FIGS. 7 and 8, when operating the watercraft in the forward operative state, the vertically movable stopper 118 lies below the plane of movement of the throttle limiting lever 130; and accordingly, the vertically movable stopper does not impede the movement of the throttle limiting lever 130 in this operating condition.

When operating the watercraft in the reverse operative state, the upper portion of the vertically movable stopper 118 lies within the plane of movement of the throttle limiting lever 130 such that upon movement of the throttle limiting lever 130 in the direction of the arrow (FIG. 8), the lower vertically extending portion 134 of the forward stepped face of the throttle limiting lever 130 contacts, and is stopped by, the stopper 118

When operating the watercraft in the neutral operative state, the upper portion of the vertically movable stopper 118 lies within the plane of movement of the throttle limiting lever 130 such that upon movement of the throttle limiting lever 130 in the direction of the arrow, the upper vertically extending portion 132 of the forward stepped face of the throttle limiting lever 130 contacts, and is stopped by, the stopper 118.

When operating the watercraft in the forward operating state at a speed greater than the maximum reverse operating speed it is not possible to shift directly to the reverse or neutral operating states, as the top of the moveable stopper 118 would contact, and be stopped, by the underside of the throttle limiting lever 130. Similarly, when operating the watercraft in the reverse operating state at a speed greater than the maximum neutral operating speed, it is not possible to shift directly to the neutral operating state, as the top of the moveable stopper 118 would contact, and be stopped, by the underside of the forwardmost stepped portion of the throttle limiting lever 130.

In the embodiments of FIG. 6 and FIGS. 7 and 8, the portions of the throttle opening limiting system not mentioned can be considered to be structurally and functionally similar to the elements of the embodiment of FIGS. 2 through 5 discussed above in detail.

The foregoing description is, of course, only that of the preferred embodiments of the invention and various changes and modifications may be made without departing from the spirit and scope of the invention, as defined by the appended claims.

It is claimed:

1. A throttle opening limiting system for an engine of a marine propulsion unit, comprising: a manually operated transmission control system for shifting between forward, neutral and reverse operative states; and further, a throttle, a manually operated throttle control device and an intermediate linkage arrangement operatively connecting said manually operated throttle control device to said throttle, said intermediate linkage arrangement further comprising a throttle opening limiting mechanism operable for setting a distinct and different maximum obtainable throttle opening position for each of a forward a neutral and a reverse operative state of said marine propulsion unit; wherein said throttle opening limiting mechanism includes a blocking element and a first lever; and further including a cowling member surrounding said engine; wherein said blocking element and said first lever are located within said cowling member; wherein said blocking element is a stopper member which is arranged for linear movement along a generally vertical direction; and wherein said first lever is disposed along a generally horizontal plane and is arranged for movement in a generally horizontal fashion within its plane of disposition.

2. A throttle opening limiting system for an engine of a marine propulsion unit, comprising: a manually operated transmission control system for shifting between forward, neutral and reverse operative states; and further, a throttle, a manually operated throttle control device and an intermediate linkage arrangement operatively connecting said manually operated throttle control device to said throttle, said intermediate linkage arrangement further comprising a throttle opening limiting mechanism operable for setting a distinct and different maximum obtainable throttle opening position for each of a forward a neutral and a reverse operative state of said marine propulsion unit; wherein said throttle opening limiting mechanism includes a blocking element and a first lever which are mounted in unobstructed direct proximity to said engine; wherein said blocking element is a stopper member which is arranged for linear movement along a generally vertical direction; and wherein said first lever is disposed along a generally horizontal plane and is arranged for movement in a generally horizontal fashion within its plane of disposition.

3. The throttle opening limiting system of claim 2 wherein said throttle is fully openable in said forward operative state and is limited to an intermediate position in said reverse operative state and is limited to a smaller opening position in said neutral operative state than said intermediate position of said reverse operative state.

4. The throttle opening limiting system of claim 3 wherein said first lever is pivotable about a centrally located shaft member, and has at one end thereof a connecting element operatively connecting said lever to said throttle, and has at the other end thereof a rigid flanged portion; and wherein said stopper member has an elongated shank and a disk-shaped head positioned at the top of said elongated shank, the diametrical width of said disk-shaped head being greater than the cross-sectional width of said elongated shank; said stopper member positionable in a first position whereat said disk-shaped head of said stopper member is lower than a plane of pivotal rotation of said lever; said stopper member positionable in a second position whereat said disk-shaped head of said stopper member lies within said plane of rotation of said lever and said flanged portion of said lever engages said disk-shaped head during rotation of said lever; and said stopper positionable in a third position whereat said disk-shaped head is higher than said plane of rotation of said lever and said flanged portion of said lever engages said elongated shank of said stopper member during rotation of said lever.

5. The throttle opening limiting system of claim 4 further comprising a stopper control cam having a stepped upper surface, with two plateau portions, and moveable along a guide member positioned near the bottom of said stopper member; said stepped upper surface of said stopper control cam engageable with a lower portion of said shank of said stopper member; and, further, a shift operating cable connected to said stopper control cam and operable to move said control cam along said guide member.

6. The throttle opening limiting system of claim 5 further comprising a second lever member disposed apart from and parallel to said first lever, and pivotable about said shaft, said shaft located centrally within said second lever member; said second lever member directly linked to said manually operated throttle control member, and further, rigidly linked to said first lever, so that upon imparting pivotal movement to said second lever via said manually operated throttle control member, said first lever is caused to move synchronously with said second lever member.

7. The throttle opening limiting system of claim 6 wherein at least a portion of said disk-shaped head of said stopper member is positioned directly below said rigid flanged portion of said first pivotable lever when said watercraft is operating in the forward operative state at a speed greater than a maximum neutral operating speed so that upon attempted upward movement of said stopper member toward said neutral operative position an upper side of said disk-shaped head contacts a lower side of said rigid flanged portion of said first pivotable lever thereby impeding any such upward movement.

8. The throttle opening limiting system of claim 3 wherein said first lever has at one end thereof a link operatively connecting said lever to said throttle and a blunt region at the other end thereof; and wherein said stopper member has an elongated shank and a variable adjustable threaded head portion positioned near the top of said elongated shank within a circular receiver hole; said stopper member positionable in a first position whereat said head portion of said stopper member is lower than said plane of movement of said lever; said stopper member positionable in a second position whereat said head portion of said stopper member lies within said plane of movement of said lever and said blunt portion of said lever engages said head portion during movement of said lever; and said stopper positionable in a third position whereat said head portion is higher than said plane of movement of said lever and said blunt portion of said lever engages said elongated shank of said stopper member during movement of said lever.

9. The throttle opening limiting system of claim 8 further comprising a stopper control cam having a stepped upper surface, with two plateau portions, and moveable along a guide member positioned near the bottom of said stopper member; said stepped upper surface of said stopper control cam engageable with a lower portion of said shank of said stopper member; and, further, a shift operating cable connected to said stopper control cam and operable to move said control cam along said guide member.

10. The throttle opening limiting system of claim 9 further comprising a second lever member disposed apart from and parallel to said first lever, and movable within its plane of disposition; said second lever member directly linked to said manually operated throttle control member, and further, rigidly linked to said first lever, so that upon imparting movement to said second lever via said manually operated throttle control member, said first lever is caused to move synchronously with said second lever member.

11. The throttle opening limiting system of claim 10 wherein at least a portion of said variable adjustable threaded head portion of said stopper member is positioned directly below said blunt region of said first movable lever when said watercraft is operating in the forward operative state at a speed greater than a maximum neutral operating speed so that upon attempted upward movement of said stopper member toward said neutral operative position an upper side of said variably adjustable threaded head portion of said stopper member contacts a lower side of said blunt region of said first movable lever thereby impeding any such upward movement.

12. The throttle opening limiting system of claim 3 wherein said first lever has at one end thereof a link operatively connecting said lever to said throttle, and at the other end thereof a stepped leading face with an upper vertically extending leading edge and a lower vertically extending portion located below and rearwardly of said upper leading edge; and wherein said stopper member is rod-shaped and has an upper head portion; said stopper member positionable in a first position whereat said head portion of said stopper member is lower than said plane of movement of said lever; said stopper member positionable in a second position whereat said head portion of said stopper member lies within said plane of movement of said lever and said lower rearwardly located vertically extending portion of said stepped leading face of said lever engages said head portion during movement of said lever; and said stopper positionable in a third position whereat said head portion is higher than said plane of movement of said lever and said upper vertically extending leading edge of said lever engages said stopper member during movement of said lever.

13. The throttle opening limiting system of claim 12 further comprising a stopper control cam having a stepped upper surface, with two plateau portions, and moveable along a guide member positioned near the bottom of said stopper member; said stepped upper surface of said stopper control cam engageable with a lower portion of said stopper member; and, further, a shift operating cable connected to said stopper control cam and operable to move said control cam along said guide member.

14. The throttle opening limiting system of claim 13 further comprising a second lever member disposed apart from and parallel to said first lever, and movable within its plane of disposition; said second lever member directly linked to said manually operated throttle control member, and further, rigidly linked to said first lever, so that upon imparting movement to said second lever via said manually operated throttle control member, said first lever is caused to move synchronously with said second lever member.

15. The throttle opening limiting system of claim 14 wherein said stopper member is positioned directly below said first movable lever when said watercraft is operating in a forward operative state at a speed greater than a maximum reverse operating speed so that upon attempted upward movement of said stopper member toward said neutral operative position an upper side of said stopper member contacts a lower side of said first movable lever thereby impeding any such upward movement.

16. The throttle opening limiting system of claim 14 wherein said stopper member is positioned directly below a lower side of a horizontal portion of said first movable lever located between said upper vertically extending leading edge and said lower vertically extending portion of said first movable lever when said watercraft is operating in a reverse operative state at a speed greater than a maximum neutral operating speed so that upon attempted upward movement of said stopper member toward said neutral operative position an upper side of said stopper member contacts a lower side of said horizontal portion of said first movable lever thereby impeding any such upward movement.

17. The throttle opening limiting system of claim 2 wherein said engine is embodied in an outboard motor, said outboard motor including a cowling member encasing said engine; and wherein said stopper member is contained within said cowling.

18. The throttle opening limiting system of claim 2 wherein said propulsion unit includes a tiller extending from said unit and a grip positioned at one end of said tiller; and wherein said manually operated throttle control device comprises said grip.

19. The throttle opening limiting system of claim 2 wherein said stopper member is positioned at said engine.

* * * * *